M. ADLER.
Rivet-Holders for Flange-Work.
No. 148,798. Patented March 24, 1874.
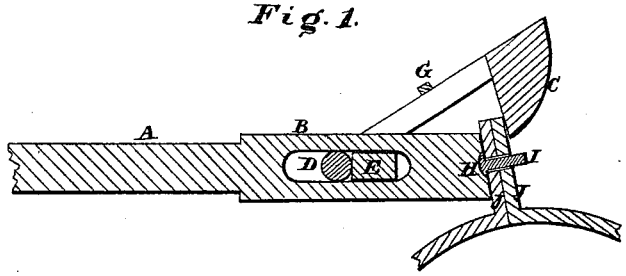
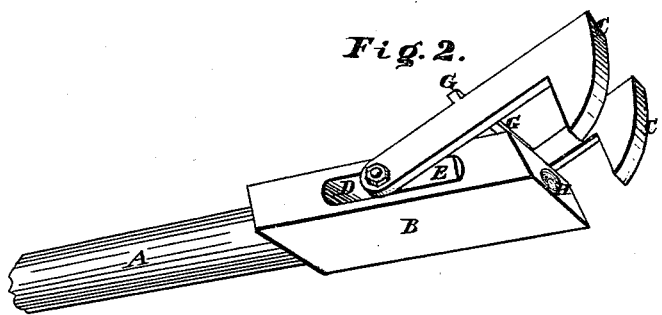
Witnesses.
George E. Buckley
Edward A. Nikidal
Inventor.
Micheal Adler,
by Job Abbott,
Attorney.

UNITED STATES PATENT OFFICE.

MICHAEL ADLER, OF CANTON, OHIO, ASSIGNOR TO THE WROUGHT-IRON-BRIDGE COMPANY, OF SAME PLACE.

IMPROVEMENT IN RIVET-HOLDERS FOR FLANGE WORK.

Specification forming part of Letters Patent No. 148,798, dated March 24, 1874; application filed January 17, 1874.

*To all whom it may concern:*

Be it known that I, MICHAEL ADLER, of Canton, in the county of Stark and State of Ohio, have invented certain new and useful Improvements in Rivet-Holders for Flange-Work; and that the following is a full, clear, and exact specification thereof, which will enable others skilled in the art to make and use the said invention.

My invention consists of a rivet-holder constructed of a bar of metal with recess for rivet-head, having an adjustable joint and swinging jaws for clamping together the edges of the pieces of metal to be riveted, and holding the rivet firmly while the head is being formed thereon, as is hereinafter more fully shown.

In the drawings, Figure 1 is a longitudinal sectional view of my rivet-holder, showing its application to the flanges of two sections of a Phœnix column, which are to be riveted together; Fig. 2, a perspective view of the same.

A is the handle; B, the joint and head block; C, the swinging jaws; D, the slotted joint; E, a joint-block for adjusting the joint, so as to accommodate the holder to various thicknesses of metal to be riveted; G, a check and tie-bar uniting the jaws C C; H, a recess for receiving the rivet-head; I, the rivet; J J, the flanges to be riveted together. The handle and block B of my holder may be either of wrought-iron or steel, or of cast-iron, though I prefer to make them in one piece of wrought-iron, having the slot for the joint punched or drilled out. The swinging jaws C I make of wrought-iron for the sake of strength.

The operation is as follows: The edges or flanges to be riveted are first brought together and the rivet is pushed into place through the holes in said flanges already made for its reception. The holder is then applied, so that the head-block B rests against the sides of the flanges J, the rivet-head resting in recess H. The swinging jaws C are then allowed to drop over the flanges, their inner edges impinging upon and clamping between them and the head-block B the flanges I, which it is desired to rivet together, the block E being of the proper size to leave the required space for the flanges J J between the jaws C C and the head-block B. The jaws C C may be simply caught onto the flanges J J, as shown in drawing, or can be dropped down their full face over said flanges in case the said flanges are not of the requisite stiffness to be held at their edges, as shown, as the space between jaws C C is sufficient to permit of the head of the rivet being formed between them. When the jaws C are to be simply caught over the flanges they may be made a continuous jaw, the rivet-head being then formed in front of them.

On applying pressure to depress the handle A, the flanges are brought tightly together, being clamped by block B and jaws C, and the rivet is then headed down in the ordinary manner. Blocks, E, of any size may be inserted so as to accommodate distance between inner edges of jaws C and the outer recessed end of block B to any thickness of flanges, J J, which it is desired to rivet together.

I would here mention that other devices may be substituted for that shown at E for adjusting the jaws C—for instance, through the block E and head B pins may be passed to adjust said block to various distances, or jaws C may be made adjustable by sliding up and down on the arms which sustain them, and being secured by thumb-screws, clamps, or pins, instead of the adjustability being at the joint D.

Having thus described my invention, what I claim as new, and desire to secure by Letters Patent, is—

A rivet-holder for flange-work, consisting of head-block with rivet-head recess and handle having swinging jaws adjustably attached thereto, to adapt the holder to various sizes of flange-work, substantially as specified.

As evidence of the foregoing specification and claim, witness my hand this 30th day of October, A. D. 1873.

MICHAEL ADLER.

Witnesses:
    JOB ABBOTT,
    A. MCKINLEY.